July 15, 1941.  J. D. MORGAN ET AL  2,249,157
METHOD OF AND APPARATUS FOR TESTING IGNITION COILS
Filed Dec. 8, 1937  2 Sheets-Sheet 1

INVENTORS
JOHN D. MORGAN
PERCY B. LEVITT
BY
ATTORNEY

July 15, 1941.    J. D. MORGAN ET AL    2,249,157
METHOD OF AND APPARATUS FOR TESTING IGNITION COILS
Filed Dec. 8, 1937    2 Sheets—Sheet 2
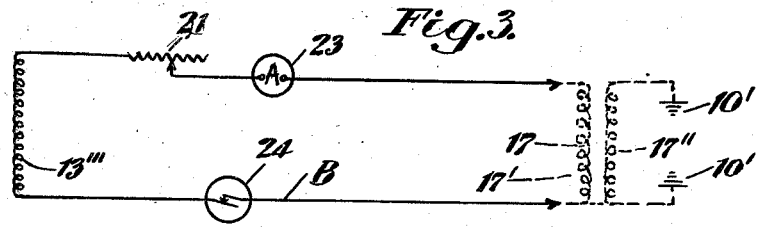
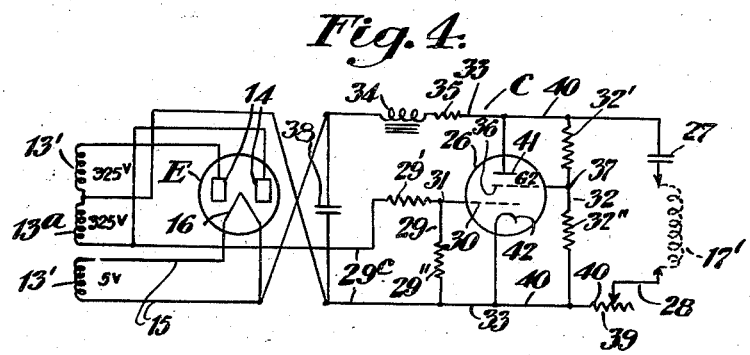
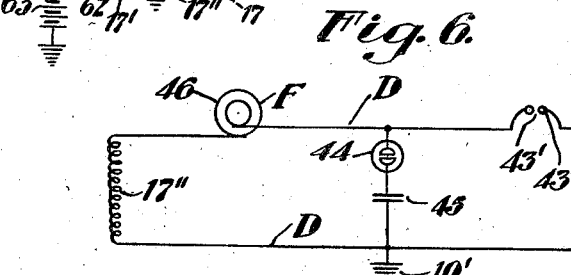
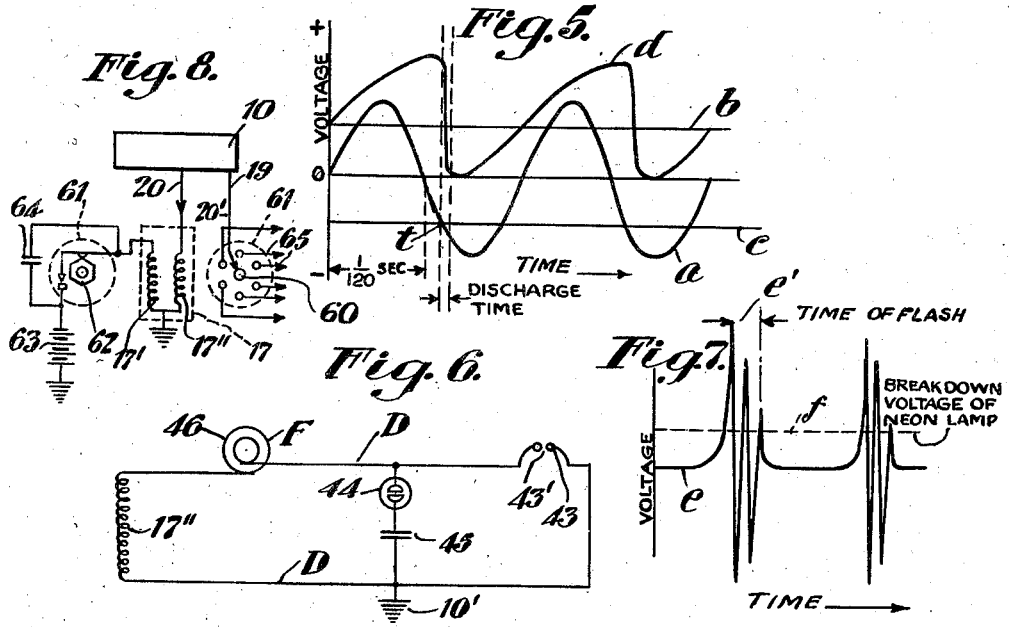
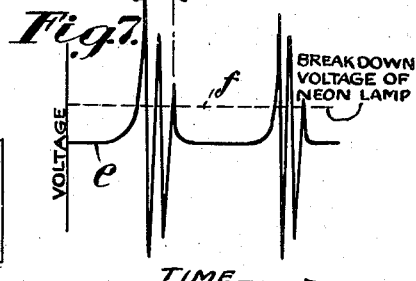
INVENTORS
JOHN D. MORGAN
PERCY B. LEVITT
BY
ATTORNEY Patented July 15, 1941

2,249,157

UNITED STATES PATENT OFFICE 2,249,157

METHOD OF AND APPARATUS FOR TESTING IGNITION COILS

John D. Morgan, South Orange, and Percy B. Levitt, Millburn, N. J., assignors, by mesne assignments, to Cities Service Oil Company, New York, N. Y., a corporation of Pennsylvania Application December 8, 1937, Serial No. 178,818

8 Claims. (Cl. 175—183)

This invention relates to method of and apparatus for testing and analyzing ignition coils and the like.

The main object of the invention is to provide a purely electrical means in the nature of a grid controlled gaseous discharge tube for analyzing or testing ignition devices on automotive engines and the like.

Another object of the invention is to provide means whereby the current necessary for exciting the coil is derived from an electrical source without the aid of a mechanical system, thereby eliminating the possibility of errors arising from the operation of mechanical apparatus.

Another object of the invention is to provide an apparatus by which a continuous stream of electrical pulses may be impressed upon the primary winding of a coil under test in order to check both the primary and secondary windings of the coil.

Another object is to provide means for testing the spark coil of an automobile under conditions which simulate very closely actual operating conditions, such as different speeds of the car, temperature of the spark coil, while the car remains stationary and while the engine itself may be cold.

Another object is to provide a coil tester which will operate from an alternating current power line to simulate certain engine speeds at which the coil to be tested will operate.

Another object of the invention is to provide a simple portable tester which may be used in production testing of automobile coils or in actual service testing of automobile coils in place.

The foregoing objects of the invention have been accomplished by a novel coil tester using an electrical circuit in which a grid controlled gaseous discharge tube is employed. A discharge tube of this type contains at least three elements; a cathode for supplying the electrons which carry the current, one or more grids for controlling the starting of the discharge, and a plate. The type of discharge tube to be described further is one of several types which may be employed in the novel electrical circuit of the coil tester. Each tube, however, is associated with a particular tube circuit, although the circuit theory to be further described will apply to the operation of all the tubes.

In the coil tester circuit, the discharge tube has been adapted to a special circuit whereby a train of electrical pulses passes through the primary winding of a coil under test. The voltage thereby induced in the secondary winding produces a discharge across a spark gap. The energy in any single current pulse is made just sufficient to overcome the normal losses within the coil and break down the spark gap. If the coil losses should be abnormal, as will be the case with an open secondary turn, a shorted secondary, or a high distributed capacity, the energy supplied to the coil will not be sufficient to overcome these losses and no spark will occur.

One type of coil tester herein called a "Universal" type, is equipped with a calibrated variable spark gap and a calibrated load rheostat. With this type of coil tester, it is necessary to know the respective gap and rheostat settings for the particular coil to be tested.

In another type of coil tester herein called a "go or no go" type, no external adjustments are made, the circuit constants being fixed to test coils manufactured to given specifications. A set of fixed points sealed in an evacuated glass tube constitute the spark gap.

The foregoing and other objects and features as will hereinafter appear, are accomplished by the invention which is fully described in the following specification and shown in the accompanying drawings in which:

Figure 3 is a portion of the electrical circuit diagram showing the coil heater circuit;

Figure 4 is a portion of the electrical circuit diagram showing the discharge circuit;

Figure 5 is a graph representing the voltage on the control grid as a function of time;

Figure 6 is a portion of the electrical circuit diagram showing the coil output circuit;

Figure 7 is a graph representing the voltage impressed on a neon lamp as a function of time; and Figure 8 is a diagram showing the coil tester in the engine ignition circuit.

Figure 1:
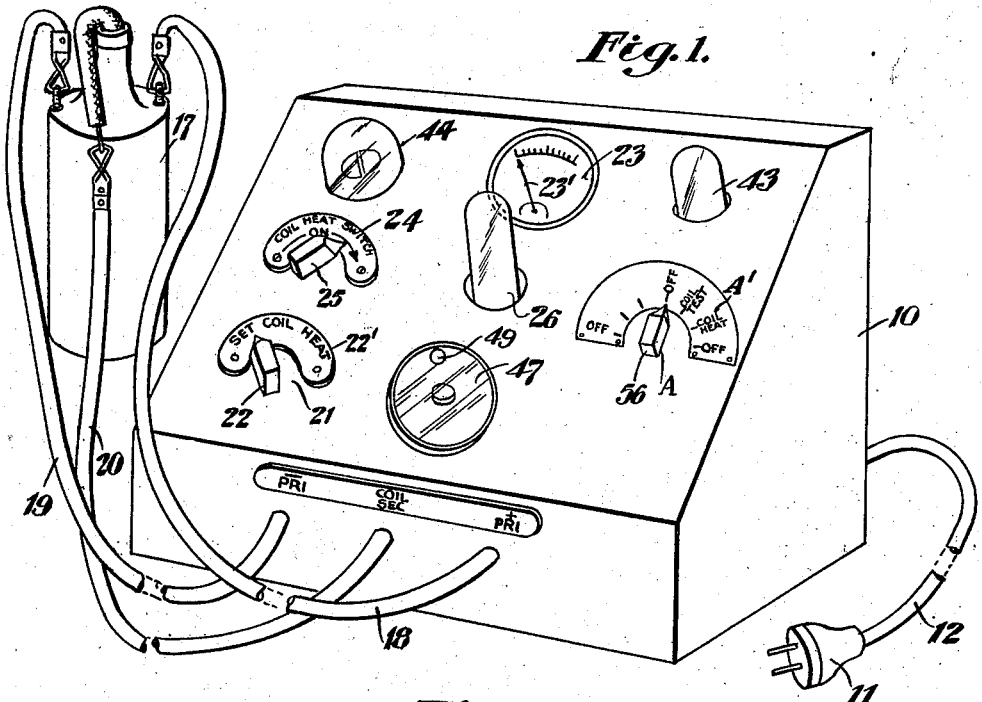
Figure 1 is a foreshortened front elevation of the complete coil tester embodying the invention.

The embodiment of the invention illustrated comprises a coil tester having a cabinet 10, preferably of sheet metal, in which the units of this coil tester are suitably mounted, as shown in Figure 1.

Figure 2:
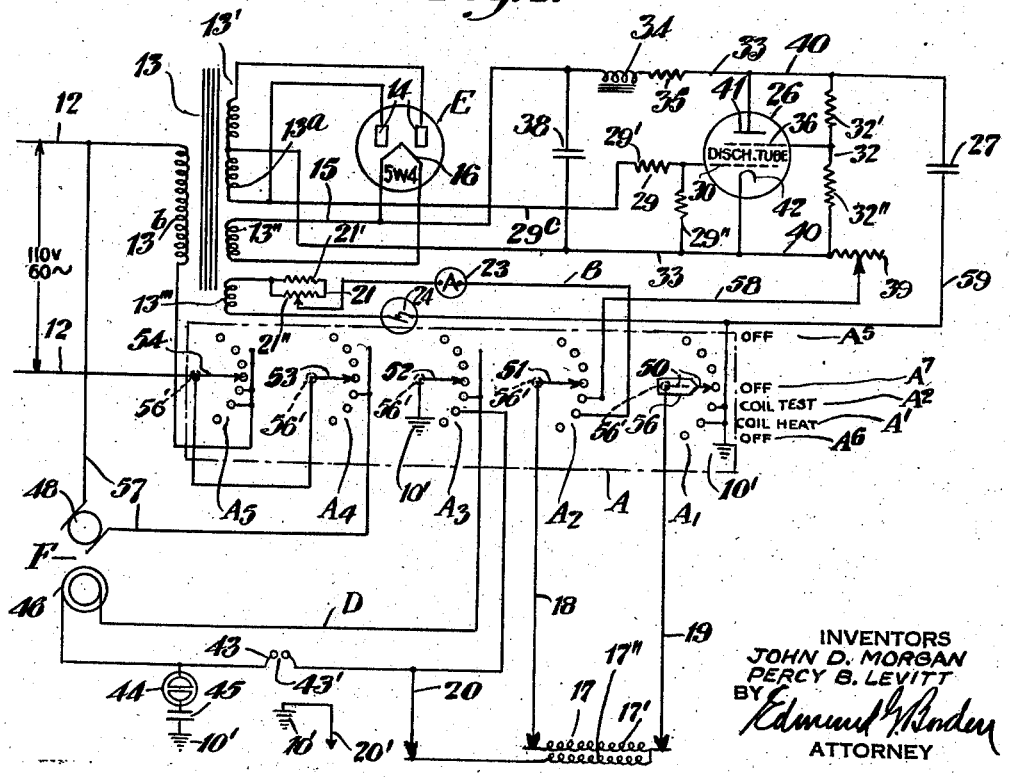
Figure 2 is an electrical circuit diagram of the invention.

Figure 2 shows the preferred wiring diagram of the invention, and shows the various electrical parts coupled or connected together electrically. As shown in Figures 1 and 2, a plug 11 may be connected to a suitable source of alternating current such as 110 volts, 60 cycle A. C. lighting circuit. Through a lighting cord 12, the A. C. supply circuit is connected to the electrical circuit of the invention by means of a multiple selector switch or switching means A, shown diagrammatically in Figure 2. The multiple selector switch A is disclosed in detail in U. S. Patent No. 1,975,247 to Andres et al., granted October 2, 1934. The alternating current supply is connected to a power transformer 13 suitably mounted in a cabinet 10 and is shown diagrammatically in Figure 2. A secondary 13' of the transformer 13 has several taps which supply a secondary voltage of substantially 325 volts to a plate circuit and plates 14 of a full wave rectifier tube E of the type known as 5W4. A filament voltage of five volts is also furnished by taps of a secondary 13" to a filament circuit 15 to which a filament 16 of the rectifier tube is connected. The rectifier tube E is conveniently mounted in the cabinet 10.

The power circuit supplies the necessary voltage for the functioning of the coil tester. The coil tester circuit, as shown in Figure 2, may best be analyzed by considering separately three component circuits called a coil heater circuit B, a discharge circuit C, and a coil output circuit D.

The coil heater circuit B serves to bring a coil 17 having a primary winding 17' and a secondary winding 17" which is to be tested, up to the operating temperature necessary preliminary to testing. The coil with its primary and secondary windings may be considered as an unknown electrical circuit to be tested. The coil 17 is connected to the coil tester by primary leads 18 and 19 which are respectively the positive and negative terminals on the coil tester. A secondary lead 20 is connected to the secondary winding 17" of the coil, as best shown in Figures 1 and 2. With the coil secondary 17", as shown in Figure 3, being shorted, the coil primary 17' is connected in series with a 12 volt secondary winding 13'" of the power transformer 13. As shown in Figures 1, 2 and 3, a rheostat 21 is connected in the coil heater circuit. The rheostat 21 comprises a six ohm and a five ohm resistance 21' and 21" respectively connected in parallel. The rheostat 21 is operated by a handle 22, as shown in Figure 1. An ammeter 23, Figures 1, 2 and 3, is connected in series in the circuit, and determines whether the proper adjustment has been made by rheostat 21 for adjusting the current of from 5 to 10 amperes in the coil heater circuit B.

As shown in Figures 1, 2 and 3, a time switch 24 in the coil heater circuit B interrupts the current flow after a definite period of time which in the preferred embodiment of this invention is for substantially five minutes. The coil heating circuit is controlled by the clock-operated time switch 24 which is set by rotating a control handle 25, Figure 1, in a clockwise direction as far as it will go. The heating current flowing through the coil primary winding 17' is adjusted by the rheostat 21 by the handle 22 over a dial marked "set coil heat" 22', until the ammeter 23 gives the reading indicated by a mark on the ammeter scale. When the selector switch A is turned to coil heat position A', Figures 1 and 2, the secondary winding 17" of the coil 17 is short-circuited automatically. The clock-controlled heater switch 24 runs for about five minutes, and at the end of this period the ammeter pointer 23' will fall back to zero position. The coil 17 is now at the required temperature for testing.

The discharge circuit C, shown in Figures 2 and 4, supplies a train of electrical pulses which pass through the primary winding 17' of the coil under test. The essential component parts necessary to this circuit C are: a grid-controlled gaseous discharge tube 26 through which a condenser 27 of .25 microfarad discharges; a source of D. C. voltage for charging the condenser 27; a source of A. C. voltage for timing the discharge; and a load 28 comprising a resistance in which part of the energy stored in the condenser is dissipated.

Referring to Figures 2 and 4, the means for applying the necessary voltages to operate the discharge tube 26 for passing and controlling the passage of a discharge will be described. A voltage divider 29 is connected directly across a secondary winding 13a of the power transformer 13. A 60 cycle A. C. voltage is applied to a control or inner grid 30 from a tap 31 on the voltage divider 29. The voltage divider 29 comprises a resistance 29' of 250,000 ohms and a resistance 29" of 70,000 ohms in series in a circuit 29c, which is energized from the secondary 13a of the power transformer 13. Referring to Figure 5, curve a, there is shown the oscillogram of the 60 cycle A. C. voltage which is applied to the control grid 30 from a tap 31 on the voltage divider 29.

Another voltage divider 32, comprising a resistance 32' of 150,000 ohms, and a resistance 32" of 50,000 ohms connected in series, is connected across the condenser 27. The full wave rectifier circuit 33 charges the condenser 27 of 0.25 microfarad through a choke coil 34 of 11 henries, and a resistance 35 of 20,000 ohms in series therewith, these values forming the constants of this circuit. A voltage is applied between the cathode and a second or outer grid 36 of the discharge tube 26 from a tap 37 of the voltage divider 32. The full wave rectifier circuit 33 has a filter condenser 38 of 8 microfarads. Figure 5, curve b, shows the maximum value of the positive voltage applied to the second grid 36 with respect to the cathode 42 from the tap 37 on the voltage divider 32.

Referring to Figure 5, it is seen that the voltage difference, as shown by curves b and a, between these two grids varies, and at a definite point t, as shown on curve a, in the control grid voltage cycle, this voltage difference is of sufficient magnitude to initiate a glow between the grids to cause a discharge of the tube 26. The magnitude of the critical discharge voltage impressed on the inner grid 30 which causes the discharge tube 26 to begin to discharge is shown in curve c of Figure 5. The curves b and c represent graphically the value and polarity of the voltages which must be applied to the grids 30 and 36 at time t to initiate a discharge. The algebraic difference between the values represented by the curves b and c is the initial glow potential or critical potential difference between grids 30 and 36 in this embodiment of the invention to cause the tube 26 to discharge. It is obvious that other types of grid controlled gaseous discharge tubes may be used instead of the particular type of grid controlled gaseous discharge tube herein described. The tube 26 discharges condenser 27 during each cycle of the A. C. grid voltage applied on the inner grid 30, and the discharge begins at point t. This is indicated graphically by the A. C. timing voltage, curve a, crossing the curve c indicating the critical discharge voltage applied to the grid 30.

The condenser 27 of .25 microfarad, the coil primary winding 17', and a variable load resistance 39 of 40 ohms maximum, are connected in series in a plate and cathode circuit 40 of the grid-controlled gaseous discharge tube 26. The gaseous discharge tube 26 has a plate 41 and a cathode 42 between which is applied the voltage on condenser 27. The condenser 27 charges from the D. C. source, condenser 38 which in turn is supplied by the full wave rectifier tube E. The rise of the voltage of condenser 27 is gradual, due to the action of the choke coil 34, and the voltage of condenser 27 is shown by an oscillogram which is curve $d$ of Figure 5.

Again referring to Figure 5, at time $t$, the condenser 27 has been substantially fully charged. At this time the timing voltage impressed between the control grid 30 and the cathode has reached a critical discharge point $t$ where the timing voltage curve $a$ crosses a curve $c$ indicating the magnitude of the critical discharge voltage impressed on the grid 30, and the tube fires. The gaseous discharge tube 26 is a gas filled tube having a caesium-coated cold cathode 42. The grids 30 and 36 serve as auxiliary electrodes for starting purposes and for electrostatic shields. The discharge or firing of the tube is begun by starting a glow between two elements and in this instance between the grids 30 and 36. The firing of tube 26 is caused by the grid 36 having impressed thereon a sufficient positive voltage while the potential of the plate 41 is substantially positive and the potential of the grid 30 is negative, all with reference to the cathode 42. In this instance, a glow starts between the grids 30 and 36 with a grid 30 as a "momentary cathode," after which, a discharge develops from the cathode 42 to the plate 41 if the glow between the grids is sufficiently intense to ionize the gas in the tube. Once the flow is started, it transfers into an arc and discharges the condenser 27. The tube 26 acts primarily as an infinite resistance until the discharge across the tube is initiated by the control grids 30 and 36 to cause the condenser 27 to discharge. Upon the discharge of the condenser 27, the cycle is repeated.

The condenser 27 discharges its energy through the load resistance 39 and the coil primary winding 17'. The period of discharge of the condenser may be suitably controlled to simulate the action of the cam operated breaker of an ignition circuit operating at various speeds.

This condenser discharge takes place in a very short time, after which the tube and circuit are ready to repeat the cycle. A discharge occurs once for each cycle of the A. C. timing voltage applied to the control grid 30, so that a train of 60 electrical pulses per second, or 3600 per minute, pass through the coil primary winding 17'.

The lower the resistance 39 the greater the voltage induced in the secondary winding 17" of the coil 17. Ignition coils fall into several classifications, and a load resistance setting for each classification is necessary. This setting may be fixed for the particular type of coil to be tested. An alternate method is variation of the capacity of the condenser 27 whereby several energy input levels may be fixed for the several coil classifications.

As best shown in Figures 2 and 6, the coil output circuit D affords a visual indication of the character of the coil discharge. The induced secondary voltage from the secondary winding 17" of the coil to be tested is applied across a stroboscope F in series with a spark gap 43, as shown in Figures 1, 2 and 6, and a neon lamp 44 shunted to the ground 10' through its inherent capacity as represented by a radio frequency capacity condenser 45.

The stroboscope F affords a method for checking the coil and condenser combination and is useful only when the coil under test is excited by an ignition circuit of a car engine. When connecting the tester to the ignition circuit, the lead 20 is connected to the spark plug wire, and the lead 19 is connected to a spark plug for testing each spark plug circuit separately. In this case only the coil output circuit D of the coil tester is used.

The stroboscope consists of a circular neon lamp 46 mounted directly in back of a circular disk 47 driven by a motor 48, Figure 2. The neon lamp 46 will flash each time an impulse passes from the coil 17, and this flash shows through a circular translucent opening 49 in the disk 47. When the car engine is brought into synchronism with the stroboscope motor, a sharply defined image or satisfactory circular pattern will appear on the rotating disk 47 if the coil condenser combination of the ignition circuit is satisfactory. If however the coil condenser circuit of the motor has a high power factor, an oscillation will occur. Instead of being round, the pattern will become comet-shaped to a degree, depending on the duration of the oscillation. This is best illustrated by Figure 7 in which the voltage is plotted as a function of time. A curve $e$ shows the characteristic discharge through the neon lamp. The time of flash is indicated as at $e'$. A curve $f$ shows the break-down voltage of the neon lamp 46.

The neon lamp 44 affords a visual indication of the character of the spark discharge. The discharge itself may be studied by viewing the spark across the gap 43' of the spark gap 43.

In using the coil tester, the operator plugs in an A. C. circuit by means of the plug 11, after having connected the leads 18, 19, and 20 to the coil 17 to be tested, with the selector switch A in the off position $A_7$, as shown in Figure 1. The multiple selector switch A has a plurality of contacts arranged in the positions $A^1$, $A^2$, $A^5$, $A^6$, and $A^7$, as shown diagrammatically in Figure 2. The contacts of the multiple selector switch are arranged in curved banks $A_1$, $A_2$, $A_3$, $A_4$, and $A_5$. Contacts 50, 51, 52, 53 and 54 are arranged to simultaneously pass over the fixed contacts of the banks $A_1$, $A_2$, $A_3$, $A_4$, and $A_5$, respectively, by rotating a handle 56 as the contacts 50, 51, 52, 53 and 54 are adapted to rotate with a common shaft 56' and are insulated therefrom. It is therefore obvious that by turning the handle 56 of the selector switch A that the various circuits of the coil tester may be selected at will power transformer 13 is connected in this position $A^1$ of the selector switch by means of the $A^1$ of the switch A, heating current is furnished from the power transformer 13 from the leads of the secondary 13'''. The primary $13^b$ of the heating circuit so that the coil may be heated to the correct temperature with the contacts 50, 51, 52, 53 and 54 rotated to the coil heat position $A^1$ so that the secondary winding of the coil is short-circuited automatically. In this position by rotating the contacts 50, 51, 52, 53 and 54 contact 54 in the bank of contacts $A_5$ in the coil heat position $A^1$. In this position of the selector switch on the bank of contacts $A_4$, the motor circuit 57 of the stroboscope F is disconnected from the 110 volt supply circuit; although in the position A² the motor circuit of the stroboscope F is connected in parallel with the primary 13ᵇ of the power transformer 13.

The coil output circuit D is connected to the multiple selector switch A by means of the moving contact 52 and the fixed contacts in the bank A₃ in the positions A² and A¹. In the position A¹ of the selector switch A₃, the bank A₃, the secondary of the coil is grounded while in the position A² of the bank of contacts A₃, the coil output circuit D is discharged through the spark gap 43 and the circular neon lamp 46 to ground and through the neon lamp 44 to ground.

The coil heater circuit B is connected to the primary 17′ of the coil 17 when the contacts 50 and 51 are in the coil heat position A¹.

The discharge circuit C is connected to the primary 17′ of the coil 17 to be tested by means of the contacts 50 and 51 over the banks of contacts A₁, A₂, in the position A² through the leads 58 and 59 respectively; the lead 58 being connected from the bank of contacts A₂ in position A² to the load resistance 39. The lead 59 is connected from the condenser 27 to the bank of contacts A₁ in the positions A¹, A². It is therefore obvious that with the coil tester circuit described in Figure 1, it is possible to connect the primary 17′ of the coil under test respectively to a coil heater circuit B and then to a coil discharge circuit C. When the coil is connected in the discharge circuit C, observation may be made of the discharge induced into the secondary 17″ of the coil 17 in the coil output circuit D by means of a spark gap 43, a neon lamp 44, and a stroboscope F having the circular neon lamp 46 in this coil output circuit D. By these observations, it is possible to determine whether the coil is satisfactory.

After the coil has been heated by adjusting the rheostat 21 so that a circuit current flows through the primary as indicated by the ammeter 23, the clock-operated time switch 24 which has been set will automatically open the coil heating circuit in approximately five minutes. The coil is now at the required temperature for testing. The operator then sets the rheostat or load resistance 39 at the proper position required for the coil under test which may, for example, be the six-volt or twelve-volt position, depending upon whether the coil is a six- or twelve-volt coil. The contacts 50 and 51 of the switch are then moved to connect the discharge circuit C to the primary 17′ of the coil to be tested. If the tester is arranged as a fixed spark gap tester in which the spark gap 43 is sealed in an evacuated tube, a steady stream of sparks will pass the gap and the visual indicator in the form of a neon tube 44 gives a steady glow, the coil is good. The neon lamp 44 affords a visual indication of the character of the spark discharge. The discharge itself may be studied by viewing the spark across the spark gap 43.

The discharge tube 26 has been adapted to a special discharge circuit C having certain constants so that a train of electrical pulses passes through the primary winding of the coil under test. The voltage thereby induced in the secondary winding produces a discharge across the spark gap. The energy in any single pulse is just sufficient to overcome the normal losses within the coil and break down the spark gap. If the coil losses of the coil under test should be abnormal as will be the case with an open secondary turn, a shorter secondary, or a high distributed capacity, the energy supplied to the coil will not be sufficient to overcome these losses, and no spark will occur. In this "go" or "no-go" type of coil tester with the spark gap sealed in an evacuated glass tube, no external adjustments are made, the circuit constants being fixed to test coils manufactured to a given specification.

The universal type of coil tester is equipped with a calibrated variable spark gap 43 and a calibrated load rheostat 39. For each particular coil tested, the respective gap and rheostat settings must be made before testing the coil. The discharge then through the neon lamp 44 will indicate, as before, whether the coil is good if a steady stream of sparks passes the gap as in the "go" and "no-go" type of coil tester previously described.

With the selector switch A set in position A² for testing coils on the car; and as shown diagrammatically in Figure 8, the leads 20′ and 20 are connected respectively to the distributor secondary 60 of a distributor 61 and to the high tension circuit 17″ of the coil 17. The ignition circuit of the car comprises the distributor 61 having the usual make and break mechanism 62 in series with a battery 63, and a condenser 64 across the make and break mechanism 62 which in turn is connected to the primary winding 17′ of the ignition coil 17. The distributor 61 has the usual spark plug connections 65 to an engine which also operates the distributor mechanism and need not be shown for the purpose of understanding the invention. In the coil tester shown in Figure 1, the lead 19 which is grounded may be used instead of the additional lead 20′, shown in Figure 2.

Referring to Figure 2, the coil output circuit of the coil tester is connected in the position A² of the switch A. The disk 47 in the cabinet 10 serves to show the type of discharge through the spark plugs of an engine when the tester is used to test a coil and condenser combination or ignition circuit while the engine is running. The disk 47 with the translucent aperture 49 at the edge of the disk is positioned over the circular neon tube 46 that is in series with the coil secondary of the coil under test. When the car engine is brought into synchronism with the stroboscope motor 48, a stationary circular pattern will appear on the rotating disk 47 if the coil condenser combination is satisfactory. It is obvious that the type of pattern displayed depends upon the stroboscopic device being used. When the discharge is highly damped but one image of the aperture will appear, but when many oscillations occur, several images will appear, each succeeding one less brilliant, indicating that the coil condenser system is not properly balanced. It is necessary then to test the coil and the condenser of the ignition circuit separately to determine which one needs to be replaced. The neon lamp 46 will flash each time an impulse passes from the coil, and this flash shows through the translucent opening 49 in the disk 47. If however the coil condenser circuit has a high power factor, an oscillating discharge will occur, and instead of being round, the pattern will be comet-shaped to a degree depending on the duration of the oscillations. An oscillogram of the oscillating discharge is shown in Figure 7.

With the coil tester described, it is possible to time each individual cycle to the equivalent of a motor speed of 4000 R. P. M. although the original timing wave impressed on the coil tester circuit is only 60 cycles. With this type of coil tester one miss at 60 cycles is more obvious than a miss of a coil tester having a mechanical breaker at every impulse. The timing of each individual cycle for a certain motor speed is effected by varying the capacity of the condenser 27 and the resistance 39 in the discharge circuit of the coil tester.

It will be evident from the foregoing description of the preferred embodiment of the invention, that a compact coil tester has been provided with a new and novel circuit employing a grid-controlled gaseous discharge tube for passing the current necessary for coil excitation. This grid-controlled gaseous discharge tube may be considered as an electronic switch which has been substituted for the usual motor driven contact breaker. As there are no moving parts or contacts in this electronic switch, no adjustments are ever required to be made to the switch circuit.

It is also apparent from the foregoing description that a novel coil tester with a fixed spark gap for "go" and "no-go" tests have been described as well as a universal model of a coil tester which has a variable spark gap in which the controls are set in accordance with the type of coil to be tested. It is also apparent from the description that a new and novel coil heater circuit, discharge circuit, and coil output circuit has been described, to which the coil under test may be readily connected to, and disconnected from, by means of the selector switch. The coil tester described is very compact and adapted to be operated from the usual 110 volt 60 cycle A. C. lighting circuit. Standard parts have been used in this design and parts which are liable to breakage have been made accessible, such as the tubes 43, 26, and 44, so that they may be readily replaced in service.

The preferred embodiment of the invention herein described is capable of certain modifications without departing from the scope of the invention to be defined in the following claims.

What is claimed as new is:

1. The method of testing an unknown electrical circuit which comprises passing a train of electrical impulses through the unknown electrical circuit by means of a grid-controlled gaseous discharge tube having a cathode, a control grid and a second grid, applying an alternating current voltage between the control grid and cathode, and maintaining the second grid at a positive potential with respect to the cathode to cause the voltage difference between these two grids to vary to such a degree that at a definite point in the control grid voltage cycle the voltage difference is of a sufficient magnitude to initiate a discharge in the aforesaid unknown electrical circuit.

2. The method of testing an unknown electrical circuit which comprises charging a condenser from a direct current source, applying to a grid of a gaseous discharge tube which is in circuit with the unknown electrical circuit and the condenser a timing voltage which has reached the critical discharge point of the tube to cause the gaseous discharge tube to fire at the time when the condenser is substantially fully charged, and discharging the condenser through the tube, the unknown electrical circuit and a load resistance in series.

3. A coil tester adapted to receive a coil to be tested having a primary winding and a secondary winding, comprising a condenser, a power circuit for charging the condenser having a power transformer and a rectifier tube arranged in a full wave rectifier circuit and adapted to be connected to a source of alternating current, a condenser discharge circuit adapted to be electrically connected to said primary winding comprising a resistance and a grid-controlled gaseous discharge tube having a plate, a cathode, a control grid, and a second grid, and means for applying an alternating current voltage from said power transformer between the cathode and the control grid, means for maintaining the second grid positive with respect to the cathode; whereby the voltage difference between these two grids varies and at a definite point in the control grid voltage cycle this voltage difference is of a sufficient magnitude to initiate a condenser discharge through the aforesaid primary winding.

4. A coil tester adapted to receive a coil to be tested having a primary winding and a secondary winding, comprising a condenser, a charging circuit for the condenser comprising a source of D. C. potential, and a condenser discharge circuit having a gaseous discharge tube, the condenser, a load resistance, and the aforesaid primary winding of the coil to be tested connected in series, and an inductance and a resistance in the condenser charging circuit, said gaseous discharge tube having a grid and a cathode, means for applying between the cathode and grid a timing voltage which has reached the critical discharge point at the time when the aforesaid condenser is substantially fully charged whereby the aforesaid gaseous discharge tube fires and thereby discharges the condenser through the aforesaid primary winding and load resistance in series.

5. A coil tester adapted to receive a coil to be tested having a primary winding and a secondary winding comprising a condenser, a charging circuit for the condenser, and a discharge circuit for the condenser comprising a variable resistance and a grid-controlled gaseous discharge tube and means for connecting said discharge circuit with said primary winding, and means for applying an alternating current timing voltage to the control grid of said tube, whereby the aforesaid condenser is discharged through said primary winding once for each cycle of the alternating current timing voltage applied to the aforesaid control grid.

6. A coil tester adapted to receive a coil to be tested having a primary winding and a secondary winding, comprising a condenser, a condenser charging circuit, a condenser discharge circuit adapted for connection in series with the aforesaid primary winding and including a grid controlled gaseous discharge tube, said condenser charging circuit including a source of continuous current of relatively high potential compared to the potential across the tube continuously connected to the condenser, and means comprising a variable resistance in said discharge circuit.

7. A coil tester adapted to receive a coil to be tested having a primary winding and a secondary winding, comprising a condenser, means for charging the condenser including a source of D. C. potential capable of supplying a continuous current to the condenser, and a discharge circuit for the condenser including a load resistance adapted for connection in series with the aforesaid primary winding, means for discharging the condenser through said discharge circuit periodically, and means for varying said load resistance.

8. A coil tester adapted to receive a coil to be tested having a primary winding and a secondary winding comprising, a condenser, means for charging the condenser including a source of D. C. potential, and a discharge circuit for the condenser including a variable resistance and a grid-controlled gaseous discharge tube, said source of D. C. potential being arranged to supply to the condenser a continuous current of relatively high potential compared to the potential drop across said tube, together with means for inserting the primary winding of the coil under test in the condenser discharge circuit, and a calibrated variable spark gap arranged for connection in circuit with the secondary winding of the coil.

JOHN D. MORGAN.
PERCY B. LEVITT.

CERTIFICATE OF CORRECTION.

Patent No. 2,249,157.                                                        July 15, 1941.

JOHN D. MORGAN, ET AL.

It is hereby certified that error appears in the printed specification of the above numbered patent requiring correction as follows: Page 3, second column, line 56, beginning with the words "power transformer" strike out all to and including the word and reference numeral "and 54" in line 71, and insert instead the following -

> by rotating the contacts 50, 51, 52, 53 and 54 simultaneously over the plurality of contacts arranged in the positions $A^1$, $A^2$, $A^5$, $A^6$, and $A^7$, and in their respective banks $A_1$, $A_2$, $A_3$, $A_4$, and $A_5$.
>
> The coil to be tested is first placed in the coil heating circuit so that the coil may be heated to the correct temperature with the contacts 50, 51, 52, 53 and 54 rotated to the coil heat position $A^1$ so that the secondary winding of the coil is short-circuited automatically. In this position $A^1$ of the switch A, heating current is furnished from the power transformer 13 from the leads of the secondary 13'''. The primary $13^b$ of the power transformer 13 is connected in this position $A^1$ of the selector switch by means of the ;

and that the said Letters Patent should be read with this correction therein that the same may conform to the record of the case in the Patent Office.

Signed and sealed this 14th day of October, A. D. 1941.

(Seal)                                                              Henry Van Arsdale,
                                                                         Acting Commissioner of Patents.